United States Patent
Stallbaumer et al.

(10) Patent No.: US 6,647,151 B1
(45) Date of Patent: Nov. 11, 2003

(54) COALESCENCE OF DEVICE INDEPENDENT BITMAPS FOR ARTIFACT AVOIDANCE

(75) Inventors: Philip Stallbaumer, Camas, WA (US); Feng Yuan, Vancouver, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/377,340

(22) Filed: Aug. 18, 1999

(51) Int. Cl.⁷ .................. G06K 15/00; G06K 9/42
(52) U.S. Cl. ................ 382/275; 358/3.23; 358/3.26; 358/1.9
(58) Field of Search ................. 358/1.9, 3.23, 358/3.26, 3.27; 382/275

(56) References Cited

U.S. PATENT DOCUMENTS

| | | | |
|---|---|---|---|
| 4,661,986 A | 4/1987 | Adelson | 382/41 |
| 5,455,599 A | 10/1995 | Cabral et al. | 345/133 |
| 5,485,568 A | 1/1996 | Venable et al. | 395/155 |
| 5,488,674 A | 1/1996 | Burt et al. | 382/284 |
| 5,568,391 A | 10/1996 | McKee | 364/469.01 |
| 5,649,032 A | 7/1997 | Burt et al. | 382/284 |
| 5,796,861 A | 8/1998 | Vogt et al. | 382/128 |
| 6,038,349 A | 3/2000 | Cullen | 382/294 |
| 6,374,381 B1 * | 4/2002 | Moriya | 714/746 |
| 2002/0131758 A1 * | 9/2002 | Austin | |

FOREIGN PATENT DOCUMENTS

| | | | | |
|---|---|---|---|---|
| EP | 0575066 A2 | * | 12/1993 | G06F/11/00 |
| EP | 0704854 A1 | * | 4/1996 | G11C/29/00 |
| JP | 59154699 | * | 9/1984 | G11C/29/00 |
| JP | 02302686 | * | 12/1990 | G01S/15/32 |
| WO | WO93/12501 | | 6/1993 | G06F/15/02 |

OTHER PUBLICATIONS

British Patent Office Search Report dated Mar. 27, 2001.

* cited by examiner

Primary Examiner—Jerome Grant, II (57) ABSTRACT

The present invention relates to methods of coalescing device independent bitmaps ("DIBs") into images for rendering onto a printed page such that artifacts induced by global techniques for image enhancement are avoided. The present invention distinguishes three classes of DIBs for separate treatment. One group of DIBs constitute a single and sole image on the page for which full coalescence and subsequent image enhancement is appropriate. Another class of DIBs may constitute separate images on a multiple-image page for which intra- (but not inter-) image coalescence is appropriate followed by separate image-by-image global enhancements. The third class of DIBs are recognized by the present invention as unsuitable for global enhancements and, rather than risk introduction of image artifacts, no global enhancements are applied.

21 Claims, 8 Drawing Sheets

COALESCENCE OF DEVICE INDEPENDENT BITMAPS FOR ARTIFACT AVOIDANCE

BACKGROUND OF THE INVENTION

1. Technical Field

The present invention relates generally to the display and printing of digital images and, more particularly, to methods of coalescing a mosaic of separate digital image tiles, each tile presented in the form of a discrete bitmap, into a single bitmap for artifact-free image enhancement, and to methods of testing tiles to determine when coalescence is contraindicated.

2. Description of Related Art

Computer generation and processing of digital images is a vital component of present information technology. Computers have displayed information to the outside world in progressively more complex formats from alphanumeric, monochrome charts and graphs, and presently in full color images comparable in quality with the best photographs. Digital creation, manipulation and display of images is an expanding field of computer technology showing no signs of deceleration. Very few application programs are made commercially available that do not have capabilities for creating, manipulating or using high quality images for ease of program use, simplicity of communication with the user, or for entertainment, games or advertising. Thus, the engineer concerned with computer display and printing technologies must consider full color (typically 24 bit) and high resolution (typically 600 dpi) images.

The present invention relates to the interface between two digital imaging technologies; digital image enhancement and the display, printing and/or assembly of composite images from subimages referred to as "tiling." "Tiling" is the process by which a single image is constructed from several (or very many) separate components or "tiles" that are assembled into the proper spatial relationship to construct the full image. Thus, the complete image is constructed as a "mosaic" of individual tiles. Some application programs may construct separate tiles and display (or print) each tile in the proper spatial relationship to form the complete image.

Many areas of technology are presented with the problem of assembling a single coherent image from numerous component subimages. One typical example relates to satellite photography in which an orbiting satellite acquires numerous sequential images of the scene below. These separate images ("tiles") are to be assembled into a single composite image ("mosaic"). The process of assembling tiles into a mosaic is to be done in such a manner that it is not apparent to the viewer or user of the final mosaic image that it was assembled from tiles. The work of Burt et. al. describes ways of assembling mosaic images from tiles in U.S. Pat. Nos. 5,488,674 and 5,649,032. Schemes for matching common features and aligning adjacent tiles are described.

Other areas of technology also involve the assembly of mosaic images from tiles. For example, Adelson (U.S. Pat. No. 4,661,986) describes the assembly of a three dimensional image from a collection of two dimensional images of the same scene. Assembling a composite image from a series of electron micrographs is described in the work of Vogt and Trenkle (U.S. Pat. No. 5,796,861). These examples are intended to be illustrative only and not exhaust all areas of technology in which mosaic images are assembled from tiles.

However, these examples of assembling an image from tiles share a common feature in so far as it is known from the start that the images relate to the same scene. Aerial, satellite panoramic video or still photography typically depict variations of a single scene. That is, the user knows or presumes that the image tiles ought to be assembled into a single, composite mosaic image in which the separate tiles form a non-disjoint image. In addition, it is often the case that automated schemes of mosaic construction utilize the fact that consecutive images overlap, simplifying the search for common features for matching. Distinct images typically call for separate and distinct uses of the methods described by these prior works.

In the display or printing of computer generated images, the situation is more complex. FIG. 1 depicts a typical page that a computer user would wish to print (often in color, unlike FIG. 1). Application programs may create numerous tiles that need to be joined to form the separate images of giraffe (FIG. 1B), hot rod (FIG. 1C), etc. However, separate tiles forming components of distinct images (hot rod 1C, and hockey player 1D, for example) should not be joined but remain distinct images as the user has placed them on the page as depicted in FIG. 1. Therefore, any automated scheme for assembling tiles into a mosaic image must have the capability of joining tiles for a single image, and not joining tiles when separate images occur on a single page. This should be contrasted with previous tiling methods such as those noted above in which typically only a single image is under consideration, analogous to the image of FIG. 2.

Digital data for creating pages or screen displays must include in some form the particular location at which each picture element, or "pixel," is to be displayed and the color to be displayed at that particular pixel. However, modem display and printing technology is more complex than a simple rendering of pixel-by-pixel information onto the appropriate page or screen location. Color mapping, image enhancements and many other image processing procedures may be employed to render the colors on the printed page so that they appear to match, enhance contrast and/or resolution and provide myriad other image enhancements. It is imperative that image enhancements be carried out without introducing artifacts into the image. That is, while enhancing one image feature (such as contrast) artifacts (such as lines or bands) should not be created so as to detract from the overall image quality. Additionally, such image processing procedures must be rapidly performed so as not to reduce substantially the printing speed of each page or introduce annoying delays into screen displays. The interaction of tiling technologies with image enhancement technologies is the general field of the present invention.

It is convenient to consider two classes of image alteration or enhancement. A first class relates to a "local" transformation of the information in the image. That is, an image is altered pixel by pixel such that the alteration (transformation) applied to any pixel does not depend on the characteristics, alteration or transformation of any other pixel. Color mapping is a typical example of such a local image transformation in which the numerical color value of the screen display is altered to produce a printed pixel having a perceived color as close as possible to the color perceived by the viewer on the screen display. Users desire color on a printed page to be the same as that on the screen. This requires an analysis of the different color perception qualities of the images created by different devices and appropriate corrections. Such color correction is a typical example of local transformation of one image pixel into another image pixel in which the characteristics of other pixels are not considered in creating or applying the transformation. Many other local transformations may be employed as well.

In contrast to local image transformations are a variety of image enhancing procedures that depend on an analysis of several (or many) pixels for determining the characteristics and parameters of the subsequent image transformation. Such transformation depending on more than a single local pixel we denote as "non-local" or "global." Spatially sensitive filters are another name often used to denote image enhancements making use of more than the local pixel to be transformed in determining the operation to be applied. Spatially sensitive filtering applies a transformation to each pixel of the image in which the transformation applied to any particular pixel is determined by the properties of several (or many) pixels in addition to the pixel being transformed. Spatially sensitive filtering may use the properties of the entire image or bitmap or tile in determining the transformation to be applied to each particular pixel. Other examples of spatially sensitive filtering procedures include techniques are known in the art as well as vendor-specific products such as "resolution synthesis with downsampling" and "automatic contrast enhancement," both developed by Hewlett Packard. Another procedure offered by Hewlett Packard is "resolution synthesis without downsampling," a local image transformation.

However useful global image transformations may be in enhancing the image quality for the viewer, special challenges arise when used in combination with tiling. Global image transformations may use all or a substantial portion of the tile to determine the transformation applied to each pixel in the tile. Thus, different tiles will have different global properties and generate different transformations to be applied to each pixel in that particular tile. When the separate tiles are reassembled into the full image, imperfect matching at the tile-tile boundaries may be apparent. One example of such transformation-induced artifacts is depicted in FIG. 2.

Figure 2:
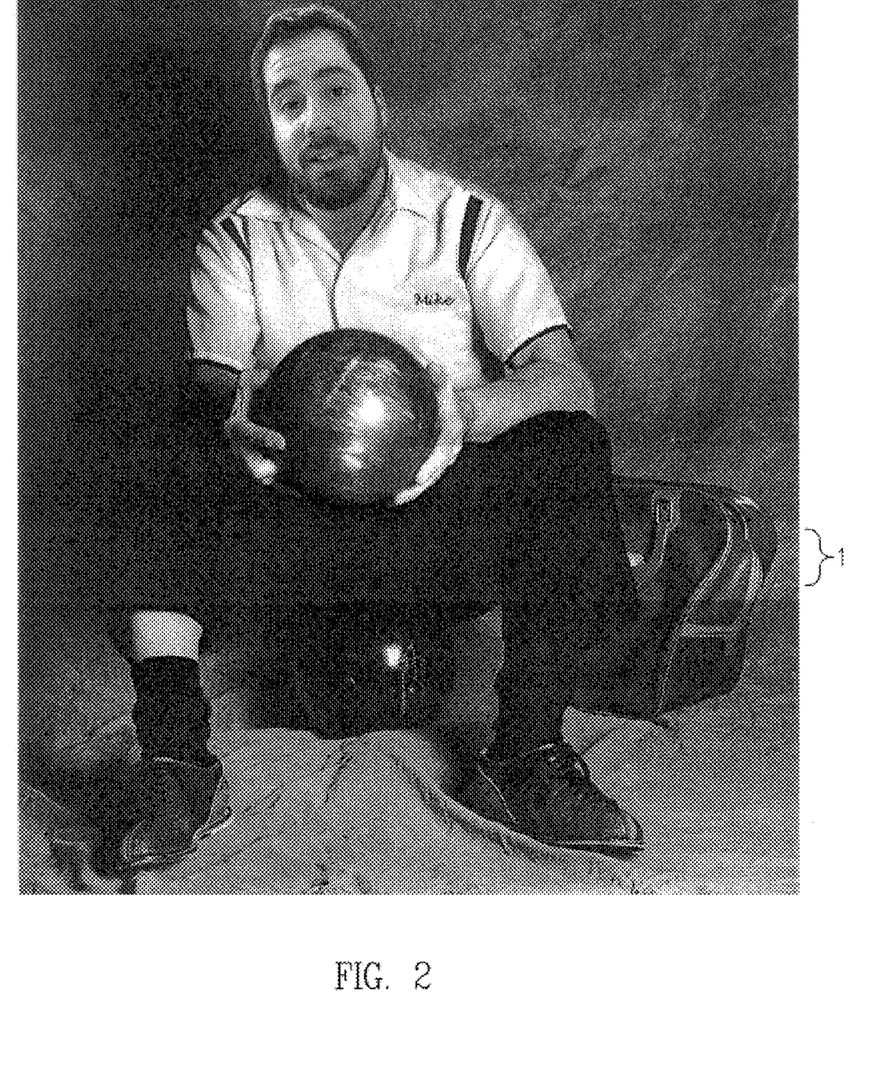
FIG. 2: Typical image page containing a single image with an example of an artifact induced by global image enhancements.

FIG. 2 was delivered by the application as tiles and assembled on the page as a sequence of horizontal stripes (the tiles) stored in the computer as a sequence of bitmaps. A global image enhancement procedure was applied to the image for the purpose of enhancing contrast. Such an image enhancement is a global transformation examining the properties of the entire tile before determining the transformation to be applied to each pixel within the tile. We note as 1 in FIG. 2 an artifact of the type that may result from such a tile-by-tile global image transformation. Tile 1 in FIG. 2 contains a larger proportion of dark region than the tiles immediately adjacent above and below. Thus, automatic application of the contrast enhancement procedure to each tile in sequence produces an overly light stripe, 1, detracting from the image quality. Thus, the benefits of automatic contrast enhancement in this case are squandered and, indeed, result in poorer image quality than had the transformation not been applied at all. The benefits of such automatic contrast enhancements are most apparent in color prints, unlike FIG. 2. However, FIG. 2 adequately depicts the image artifacts that may be introduced by automatic application of a global image transformation.

The present invention has a dual approach to image processing. Firstly, the present invention causes the tiles of a single image (FIG. 2 or each individual image 1A–1J of FIG. 1) to be assembled for global processing in such a manner that artifacts will not be created in subsequent global image enhancement procedures. That is, artifact 1 in FIG. 2 would be absent had FIG. 2 be processed according to the procedures of the present invention.

Additionally, the present invention recognizes distinct images on a single page (FIG. 1) as distinct and applies global image enhancements only within each distinct image (or not applied at all in particularly disadvantageous cases). Thus, pursuant to the present invention, artifacts arising from global image enhancements are suppressed by pre-assembly of tiles when possible. Another component of the present invention is the recognition of images in which application of global image enhancements carries significant danger of introducing artifacts, but which are not readily amenable to artifact-avoiding strategies. For such cases, the preferred route is to apply no global image enhancements at all. Recognition of such cases and avoidance of artifacts even at the cost of avoiding all image enhancements is a component of the present invention.

BRIEF SUMMARY OF THE INVENTION

The present invention relates to methods of coalescing device independent bitmaps ("DIBs") into images for rendering onto a printed page such that artifacts induced by global techniques for image enhancement are avoided. The present invention has a dual approach to image processing. Firstly, the present invention causes the tiles of a single image to be assembled for global processing in such a manner that artifacts will not be created in subsequent global image enhancement procedures. Additionally, the present invention recognizes distinct images on a single page as distinct and applies global image enhancements only within each distinct image (or not applied at all in particularly disadvantageous cases). Thus, pursuant to the present invention, artifacts arising from global image enhancements are suppressed by pre-assembly of tiles when possible. Another component of the present invention is the recognition of images in which application of global image enhancements carries significant danger of introducing artifacts, but which are not readily amenable to artifact-avoiding strategies. For such cases, the preferred route is to apply no global image enhancements at all. Recognition of such cases and avoidance of artifacts even at the cost of avoiding all image enhancements is a component of the present invention.

BRIEF DESCRIPTION OF THE FIGS.

FIGS. 7, 7A & 7B. Logic of an embodiment of DIB stitcher.

DETAILED DESCRIPTION OF THE INVENTION

In the following description and figures, similar reference numbers are used to identify similar elements.

We describe the particular embodiments of the present invention as would be typically implemented on computers running under the Windows® operating system, particularly Windows NT®, Windows 95® or Windows 98® (generically "Windows 9x") including thereby related versions of Windows as may be developed and released from time to time. We use this Windows-based description for definiteness in the description, not intending thereby to limit the scope of the present invention. Modifications of the present invention for use with other operating systems or running in different computer environments will be obvious to those having ordinary skills in the art.

Numerous formats have been developed for storing graphical images in a computer. Images in the Windows environment are commonly created as "bitmaps." Bitmaps are a pixel-by-pixel encoding according to a predefined standard or convention. A bitmap is best considered to be a memory object, not a scene (or page) image. Simply considered, a bitmap is an encoding in which one or more memory bits are used to represent the properties of each pixel. For example, 8 bits may be used to represent which of 256 color values (attributes) a given pixel may assume. Modem "true color" systems may use 24 bits to store the color attribute of a given pixel (about 16.8 million colors). Other bits may be assigned to represent other pixel attributes. The particular bitmap format presently supported under Windows makes use of a bitmap format that is independent of the particular device on which the final image is to be displayed. Such Device Independent Bitmaps ("DIBs") may contain any number of colors (palated or not) and represent any content. For example, DIBs may be the digital representation of a high color (24 bit) image acquired from a photo scanner or digital camera, or created through software design tools (for example, Corel Draw®, Photoshop® and the like).

Figure 3:
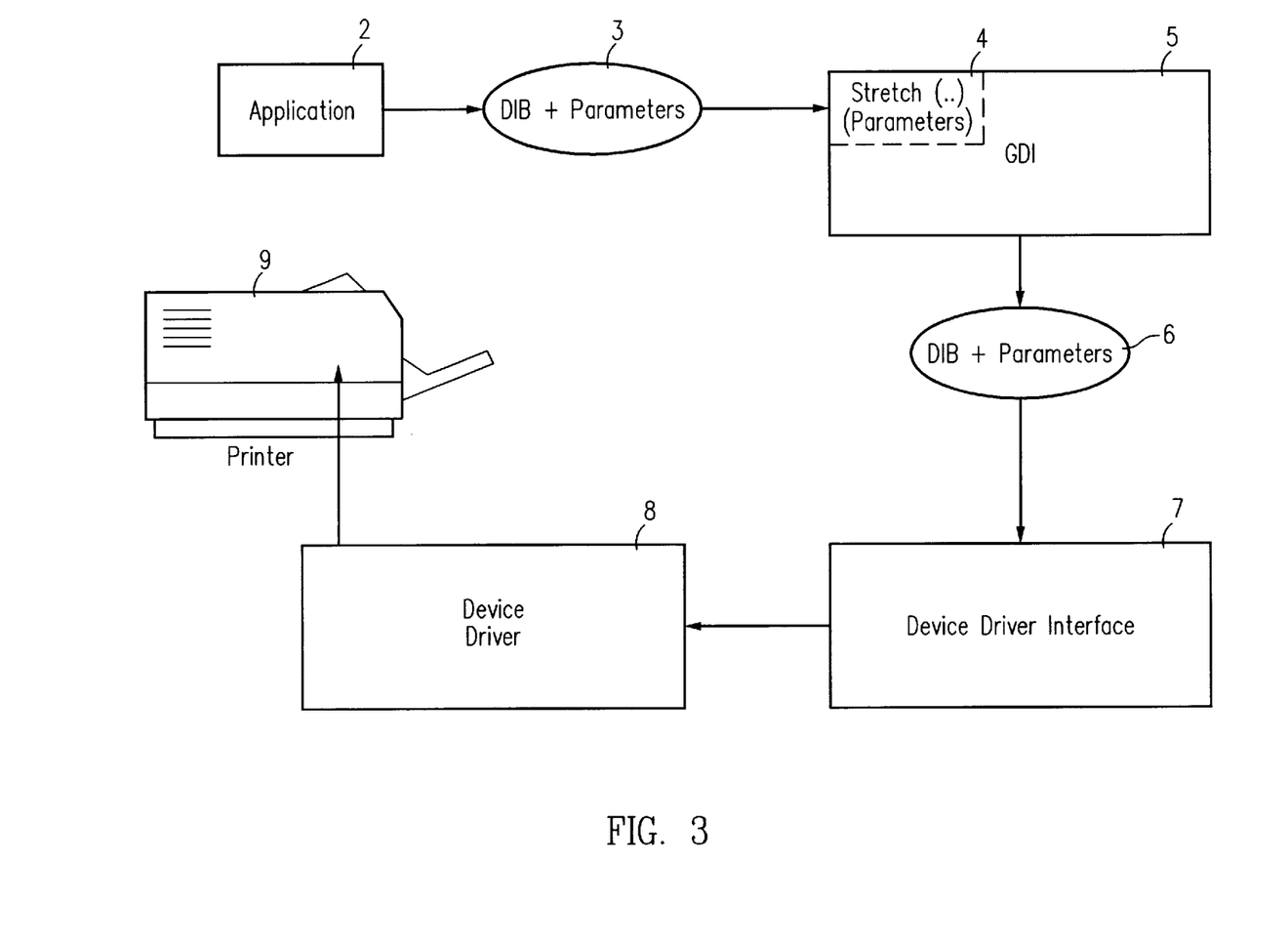
FIG. 3: High level flow chart of printing process.

FIG. 3 depicts the high level schematic flow of work from the application program, 2, to the printer, 9. For definiteness of description, we will describe the common case of printing an image onto a page. This is not intended to inherently limit the present invention to use with printers or printing, but modifications of the present invention will be obvious to those with ordinary skills in the art.

An application program, 2, will typically produce an image in the form of a DIB including associated parameters for locating the image on the page, clipping, scaling, etc. The specifics of such parameters are not necessary for a description of the present invention and we denote them collectively as "parameters" in FIG. 3. DIB may refer either to a collection of pixels comprising the image, or to the pixel data plus the other drawing parameters. An application program, 2, may produce a single DIB for a single image, or may produce multiple DIBs that are printed in close proximity so as to form the appearance of a single image. The ten images shown in FIG. 1 are each created from a single DIB, while the image of FIG. 2 consists of numerous DIBs, each DIB having the form of a horizontal strip. The horizontal DIBs of FIG. 2 extend for the full width of the image and have a vertical dimension corresponding to width 1 in FIG. 2.

A DIB leaving an application program 2 is then processed by the Windows Graphics Device Interface, "GDI," 5 in FIG. 3. The GDI is a suite of functions called by the application program depending on the task to be performed (draw a line, print a character, print an image, etc.) "Stretch" is the particular GDI function associated with outputting a DIB and takes different forms under different versions of Windows, "StretchBlt( )" in Windows NT and "StretchDIBits( )" in Windows 9x. We use "Stretch" when either function is intended without restriction. This function is named mnemonically to indicate the typical case in which the application, 2, produces a bitmap of pixels that is to be "stretched" to fill an area of screen or page. In essence, the function of the Stretch call is to identify the particular output device to which application, 2, desires to send the DIB, 3, and route it appropriately. The GDI is intended to provide a device-independent interface for the application program. That is, the authors of application, 2, need only insure that the DIB outputted from application 2, has the proper format for calling GDI and making use of the functionality within GDI, in particular, the Stretch function. GDI contains several functions related to the details of rendering the image onto the page, controlling such things as page location, scaling, whether or not the image is clipped, etc. The details of rendering a particular DIB on a particular output device need not concern the programmer supplying DIBs to GDI.

The GDI passes the DIB to the Device Driver Interface ("DDI"), 7 in FIG. 3. The GDI receives user application graphics in the form of a DIB and determines how these DIBs are to be rendered on the display device. GDI then makes requests of the resident device-dependent graphics-rendering driver interface, DDI. At this point in the progression of DIB from application to the page, the characteristics of the particular device on which the DIB is to be rendered become relevant. Typically, the DDI is isolated from the Windows operating system by GDI, GDI exporting a well-defined interface for use by all DDIs.

The DDI then passes the DIB to the appropriate device driver, 8. The device driver completes the rendering of the DIB for printing or display by the particular output device and exports the DIB to the particular device, printer 9 in FIG. 3. The present invention relates to the processing of the DIB by the device driver under the multiplicity of conditions the application, 2, may deliver the DIB to the device driver.

Figure 4:
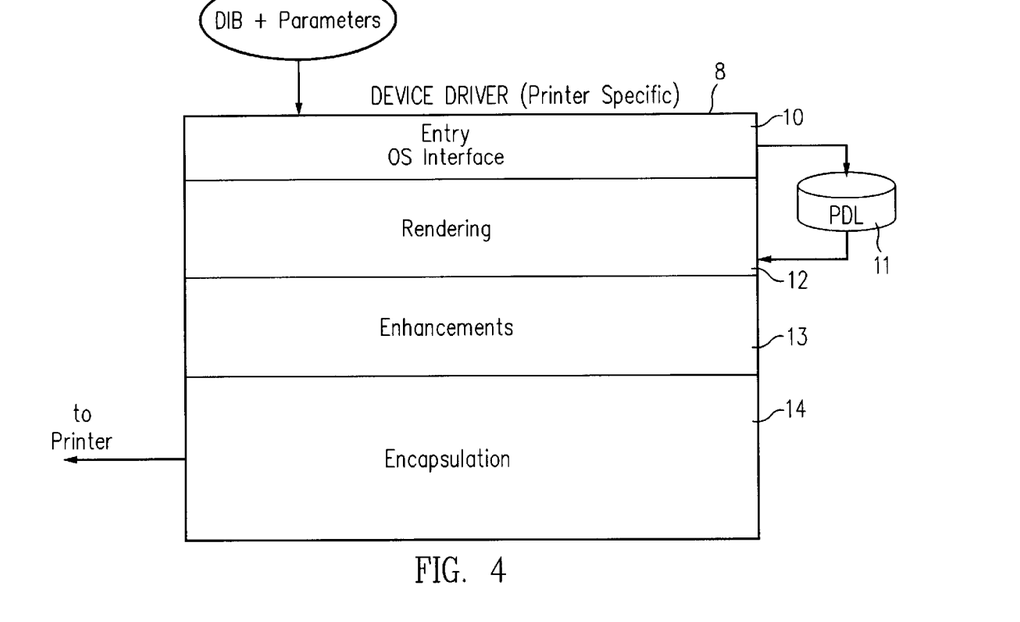
FIG. 4: Schematic depiction of typical device driver interface.

FIG. 4 depicts schematically the processing of the DIB by a conventional device driver, 8. The DIB, as passed through the GDI and DDI pursuant to the call to the Stretch function, enters the device driver at entry layer, 10. The device drivers used in connection with some classes of printers (Hewlett Packard, for example) typically make use of a separate file, called a "Page Description Language file" ("PDL file"), 11 in FIG. 4. The PDL file is typically a disk file created during the process of printing that is used to store every command that the application, 2, sends to the device driver, 8, for use in printing the image (or images). Printing an image such as FIG. 2 may involve numerous calls to the Stretch function (perhaps 700), all of which are stored in the PDL file, 11 during the process of printing FIG. 2. The chief function of the entry layer, 10, is to write all commands it receives onto the PDL file, 11. Typically, the PDL file is created sequentially as information is received permitting later manipulations of the contents of the PDL file to make use of the sequential ordering of the PDL file contents. Typically, the first instruction received by the PDL file in the process of printing a page is a "Begin Page" command. Numerous imaging commands follow and typically are concluded by an "End of Page" command. Thus, the PDL file has collected all commands necessary to print the page.

"Rendering" relates to the transformation, manipulation or otherwise processing the DIBs and other information to create the image on the page. Other processing typically follows the rendering operations to produce an image more satisfying to the user. We denote as "enhancements" all such image enhancing operations whether local or global. One such local operation is typically color mapping in which the color desired by the user (as observed on the screen) needs to be transformed such that the color on the page is as close to identical as possible. One typical implementation of color mapping is pixel by pixel, presuming that the color perceived by the observer for each pixel may be adjusted independently of the surrounding pixels. This is but one example of many local image enhancements that are known and used in the art.

However, as noted above, more sophisticated image enhancing procedures are being employed in which the adjustments made to data describing a single pixel contained in the DIB depend on a global analysis of the data describing other (or all) pixels elsewhere in the DIB. These global image enhancements may lead to the imaging artifacts described above and illustrated in FIG. 2.

The present invention avoids the introduction of image artifacts by attempted global image enhancements by means of a two-pronged attack. First, the present invention describes techniques for determining when two DIBs are adjacent and a portion of the same image. In this case, procedures of the present invention coalesce or "stitch" such DIBs into a single DIB. Global image enhancing techniques typically handle single DIB images perfectly well, and the present invention creates single DIBs from multiple DIBs in the appropriate cases. The second prong of the attack on image artifacts launched by the present invention is to recognize the absence of an "appropriate case" for DIB stitching and disable (prevent) application of artifact-prone global image enhancements. This procedure is depicted schematically in FIG. 5.

An important feature in the practice of one embodiment of the present invention is that the PDL file accumulates all DIBs making up an image before commencing to print that image. This embodiment of the present invention performs an analysis and processing steps on all DIBs as stored in the PDL file before printing any of them.

When two sequential entries to the PDL file are calls to the Stretch function, this is the indication that the stitching methods of the present invention are to be commenced. Commands such as "Begin Document," "Begin Page," "Draw Text" and the like provide helpful information in the evaluation of overall image properties but do not trigger the stitching procedures of the present invention. Stretch calls indicating that an image is to be printed are required.

Figure 5:
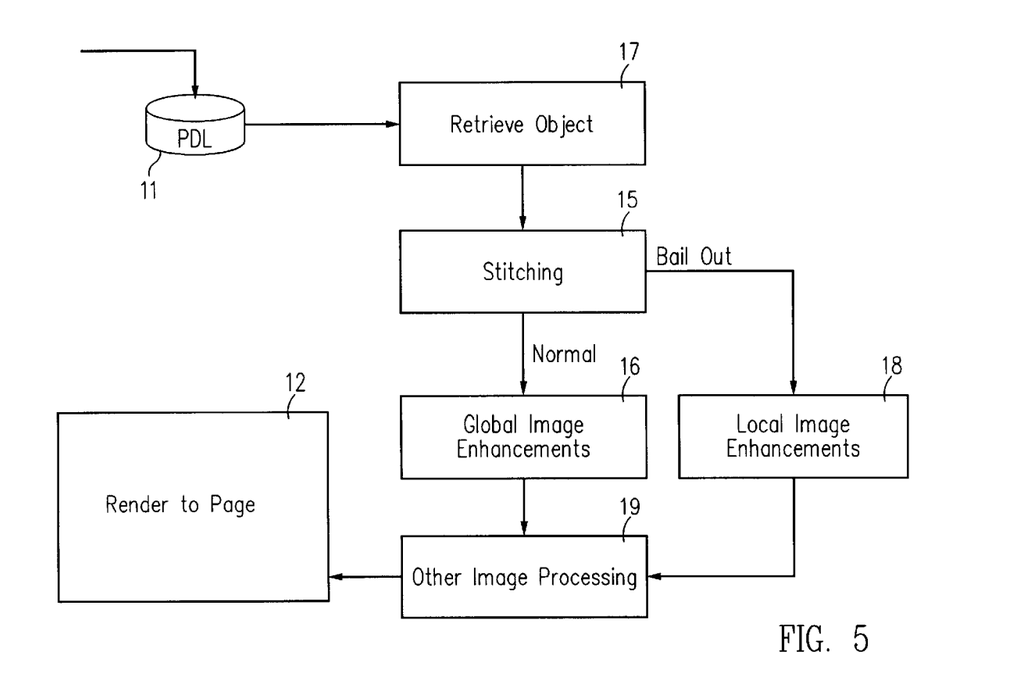
FIG. 5: High level schematic depiction of DIB stitching.

A schematic depiction of an implementation of the present invention is given in FIG. 5. The overall operation of the present invention is readily described with reference to FIG. 5 before undertaking a detailed description of specific implementations.

DIB objects are retrieved from the PDL via 17 and sent to the stitching procedure for analysis and processing. The stitching processor, 15, performs an analysis on the stream of DIB objects and arrives at one of three conclusions. If the DIBs constitute contiguous parts of a single image (and meet other criteria to be described in detail later), such DIBs are "stitched" together into a single DIB. A single DIB is not subject to the introduction of artifacts by global image enhancements such as "ACE" (automatic contrast enhancement) and "Resolution Synthesis with Downsampling" offered with some Hewlett Packard printers. Therefore, "normal" exit from the stitching processor leads to the application of any desired global image enhancing procedures, 16 with confidence that an improved image without artifacts will be the result.

The stitch processor, 15, may determine that DIBs comprising the full page have not yet been received and one of a number of termination criteria have been met (as described in more detail below). The DIBs constituting the remainder of the page are processed subsequently. These termination criteria with less than a full page of DIBs are of two types. One type recognizes that the partial page image assembled prior to termination is appropriate for image enhancement, as the separate images on FIG. 1. In such case, the DIBs processed prior to termination are outputted via the "normal exit" path for further processing by the image enhancing procedures with confidence that artifacts will not be introduced. The second type of partial page termination carries an indication that further image enhancing procedures may introduce artifacts and, therefore, should not be performed.

The decision criteria within stitch processor, 15, are implemented such that failure to exit normally is evidence that artifacts may result if global image enhancing is attempted on such an image. This "bail out" exit provides a path bypassing global image enhancements, 16. The approach taken by stitch processor, 15, is that no image enhancing is preferred to the chance of possibly introducing image artifacts. However, the bail-out path may invoke imaging enhancing procedures as an alternative to the global procedures, 16. For example, the preferred image enhancing procedures may include Resolution Synthesis with Downsampling (a global procedure) for those images in which no artifacts will result. Resolution Synthesis without Downsampling is a similar image enhancing procedure not likely to introduce artifacts. Thus, when stitching processor, 15, determines that image artifacts may result from global image processing, 16, alternative image processing procedures may be available, 18, to be used if and only if a preferred global procedure, 16, is ineligible for use due to the danger of artifacts.

Following image processing by either the normal or bail-out routes, 16 or 18 respectively, image-enhancing procedures may be applied that are independent of the particular path used. These are indicated by 19 in FIG. 6. The present invention relates to the stitching processor, 15, and the decisions made therein whether to choose normal or bail-out exit. Ancillary processing such as, 19, are not critical components of the present invention and may be performed in different orders from that shown in FIG. 6 as appropriate for the particular image rendering environment.

FIG. 6 depicts in schematic flow chart form, one embodiment of DIB stitching pursuant to the present invention. FIG. 6 depicts the basic process of DIB stitching a single image from multiple DIBs without the complications of premature termination described elsewhere herein. Aspects of these procedures are known in the art as "DIB Caching." For clarity, and not to limit the scope of the present invention, we first describe this straightforward DIB stitching procedure.

The present approach to DIB stitching is based upon a recognition of the source of image artifacts such as that denoted by 1 in FIG. 2. Such artifacts are a possibility when global image enhancements are applied to separate DIBs in a multi-DIB image. Different DIBs will possess different global features, resulting in different global image enhancements and possible artifacts. Thus, the approach is to "stitch" multiple DIB images into a single unary DIB and present the unary DIB to the global image enhancing processor as a single entity. No artifacts will be generated if the global processor is working as it should. We note that the DIB stitcher of the present invention is intended to avoid artifacts that may otherwise be introduced by image processing (enhancing) technology. The DIB stitcher will not correct artifacts generated by the application program and received in that form by the DIB stitcher.

Figure 6A:
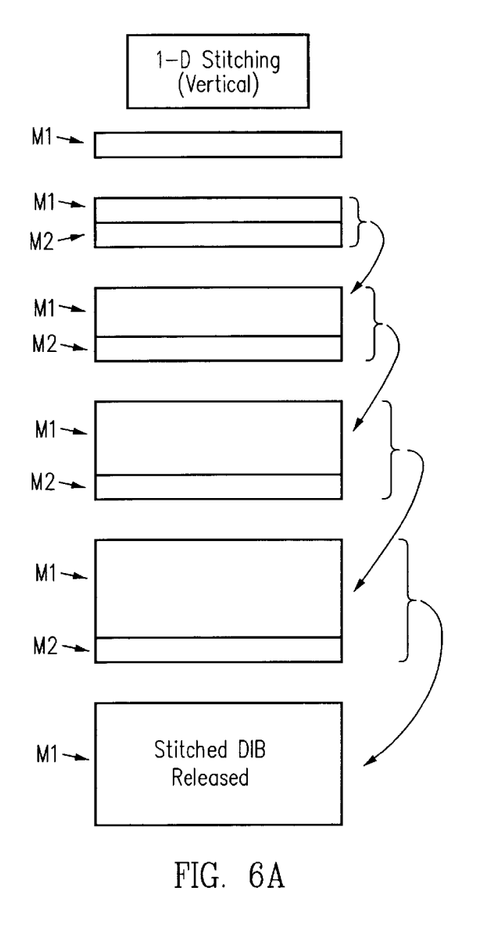
FIGS. 6A–6C: DIB stitching for well behaved DIBs.

FIG. 6 illustrates three distinct "use cases" as commonly encountered in rendering images onto paper. The first is one-dimensional stitching (vertical), the left column of FIGS. 6, 6A. In this case, the image to appear on the page is formed from DIBs in which the DIBs are horizontal bands completely across the image, presented in sequential order (top-to-bottom or bottom-to-top). FIG. 2 is an example of an image created from such DIBs (although the image of FIG. 2 has not been stitched). FIG. 6A depicts DIBs being processed from top to bottom, but bottom to top processing is equivalent. Proceeding from the top of 6A downward, a first DIB arrives and is labeled $m_1$. A second DIB arrives and is labeled $m_2$. The DIB stitching processor verifies that $m_1$ and $m_2$ are "stitchable." Two necessary criteria for stitchability are depicted in FIG. 6A; that the DIBs share a common border and this common border be the same length or "range" for both DIBs. Other criteria are also applied to determine "stitchability" as described elsewhere herein. If stitchable, the common border between $m_1$ and $m_2$ is deleted and the resulting composite DIB renamed $m_1$. The process repeats until a termination criterion is met, such as encountering an "end of page" command, receiving no further DIBs, or several other criteria as described elsewhere herein. When such termination follows normal stitching (and meets other criteria as described below), a normal exit is the result.

FIG. 6A depicts the common case in which sequential DIBs comprising a single image share a common border but do not otherwise overlap. However, overlapping DIBs can be handled by the present invention in much the same manner as bordering but non-overlapping DIBs. It is elementary analytic geometry to determine from the coordinates defining a rectangle (or other geometrical shape) in a plane whether two identical rectangles: 1) share a common border; 2) overlap and are aligned; 3) do not overlap; 4) are not aligned. By "aligned" we intend that the two DIBs have some pixels in common and can be brought into a position of sharing a common border by translation of one DIB along either x or y directions. Case 1 is depicted in FIG. 6A. Cases 1 and 2 can be stitched. Case 4 leads to "bail out" if the DIBs are touching and to a normal exit if the DIBs are not touching. Case 3 requires further analysis to determine if the non-overlapping DIBs are part of a unary stitchable image or not. Overlapping DIBs, Case 2, may be stitched as in FIG. 6A, treating the common pixels as identical.

Figure 6B:
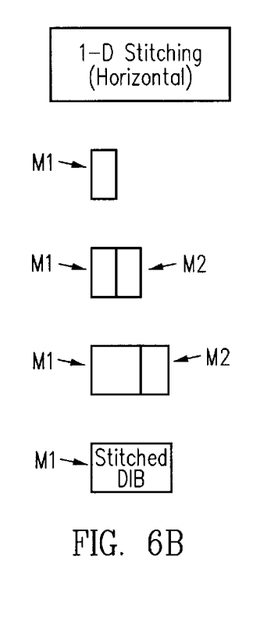

FIG. 6B is very similar to 6A as a one-dimensional DIB stitch in the horizontal direction. Each DIB constitutes a vertical slice through the full image which are arranged side-by-side to create the image. No essential changes are required from the procedures discussed in connection with 6A. Adjacent DIBs are stitched by removing the common border, considering the stitched DIB as a single DIB and retrieving another DIB for a repetition of the process.

Figure 6C:
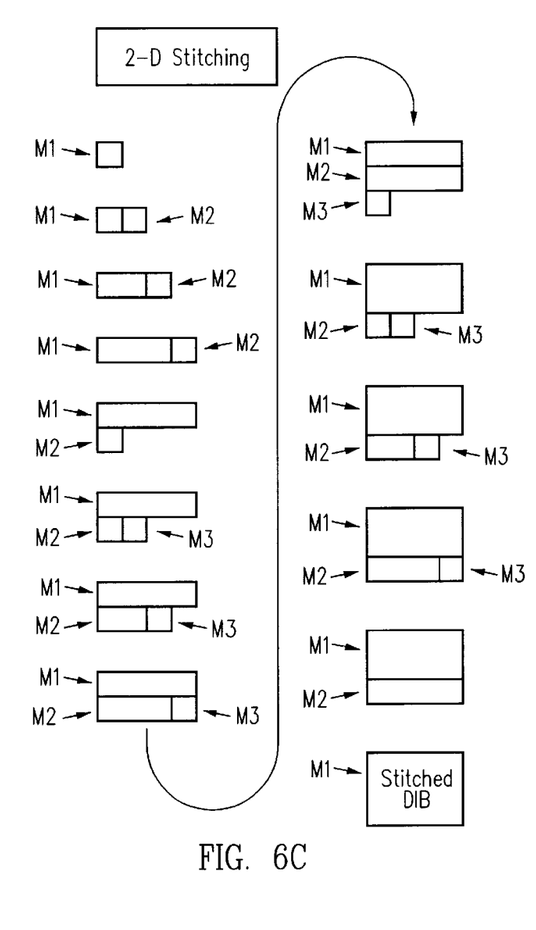

FIG. 6C depicts the case in which the image is comprised of rectangular DIBs in which both horizontal and vertical direction are spanned by multiple DIBs. This "checkerboard" DIB pattern is stitched in a manner not essentially different from that of 6A or 6B, making use of both procedures. We assume that DIBs arrive from left to right and top to bottom as depicted in FIG. 6C purely for purposes of convenience. An alternative sequence for DIBs would also be processed within the scope of the present invention. However, if the DIBs are not received in contiguous row-column order (or column-row order as would be depicted by FIG. 6C rotated by 90°), the complexity of DIB stitching increases, as described in detail below.

FIG. 6C makes clear that DIBs are stitched along their common borders so long as the common borders have the same length. When subsequent DIBs have a position on the page sharing a common border with previous DIBs but having a different length, we know another row is being formed. DIBs having common borders of different lengths are not stitched. Subsequent DIBs building the second or subsequent rows share two borders with previous DIBs; a border of the same length with the preceding DIB in the current row and a border of a different length with the DIB of the preceding row. The procedure is to stitch the DIBs along the border having the same length and testing to see if the newly stitched DIB shares a common border of the same length with another DIB. If so, we have completed a row and then stitch the rows together to form a unary DIB. Thus, the process of 6C is a generalization and combination of the procedures depicted in 6A and 6B. The discussion herein describes rectangular DIBs in detail as rectangular DIBs are anticipated to be the most commonly encountered type.

When DIBs are received in a stitchable form, the stitching procedure is essentially that depicted in FIG. 6. However, an important feature of the present invention relates to the determination of when DIBs are stitchable or not. Several tests are applied to DIBs to determine stitchability. Failure of any of these tests leads to the conclusion that stitching of these DIBs is contraindicated. The methods of the present invention determine if the stitching process will be artifact-free upon subsequent image enhancement. If so, the stitched DIBs (or in some cases a single DIB) is exported via normal exit for global image processing. If not (that is, artifacts are likely to result) "bail-out" is called for so as not to apply artifact-prone global image enhancements to such cases. A summary flow chart is provided in FIG. 7

Figure 7A:
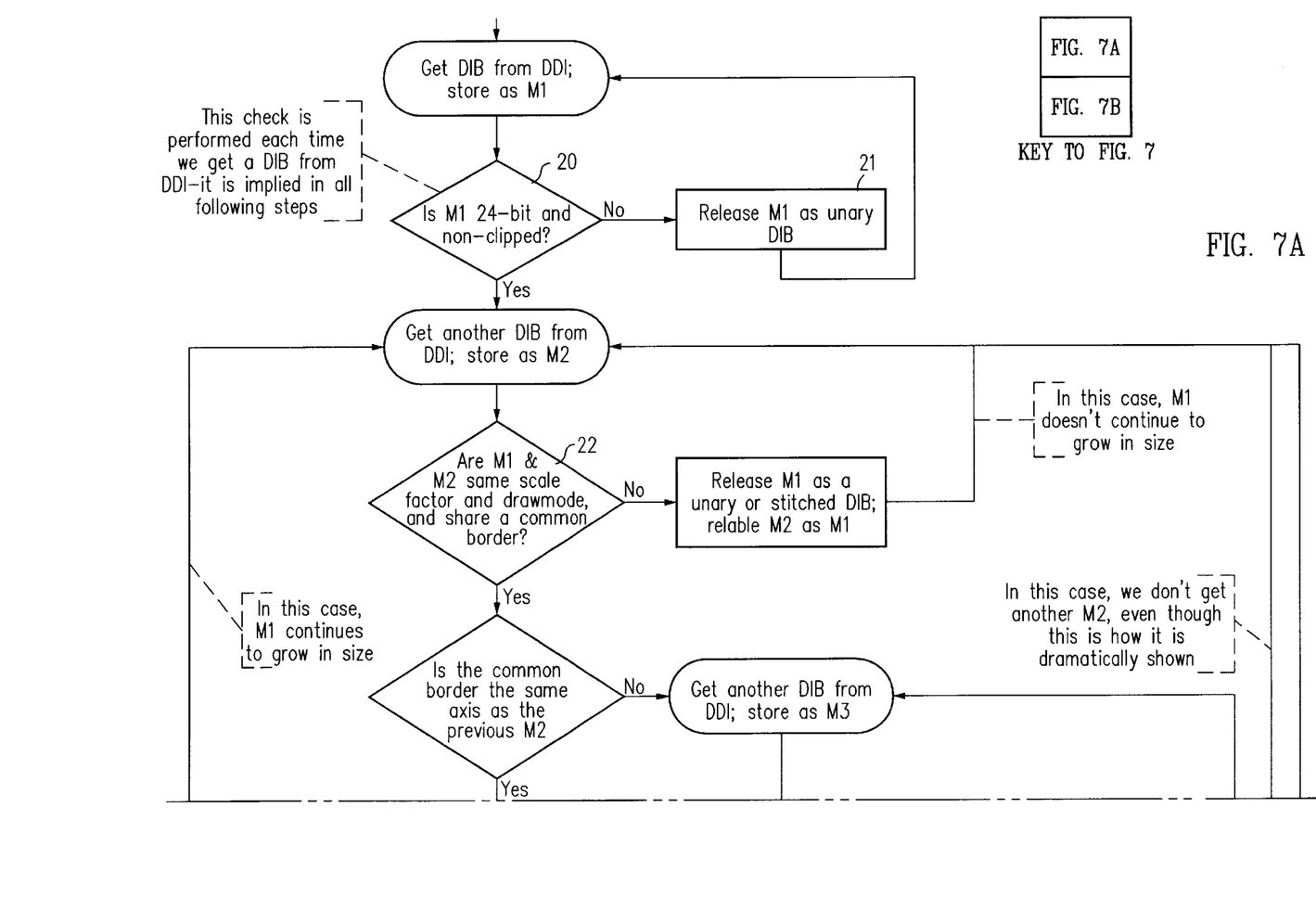
Figure 7B:
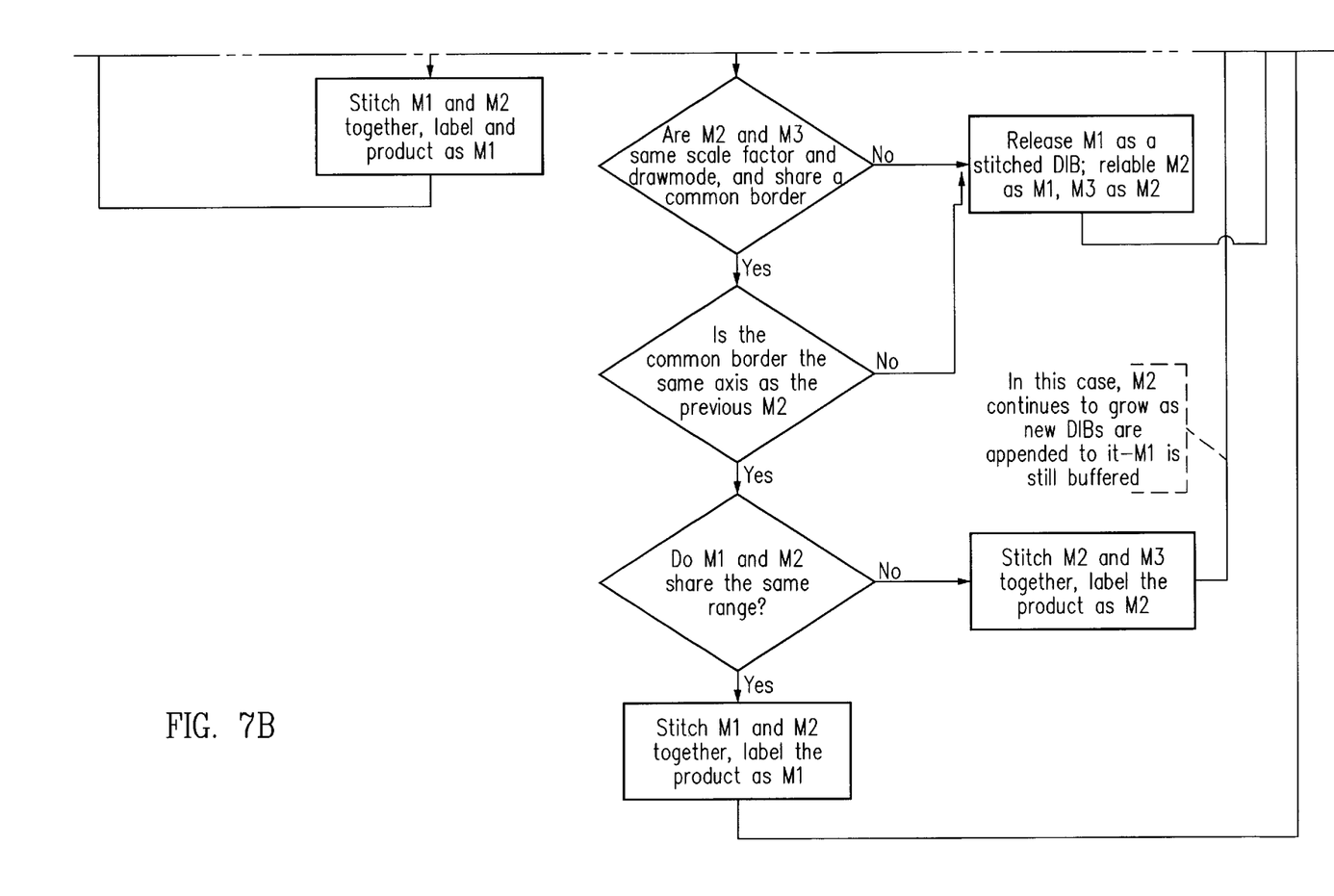

FIG. 7 depicts a flow chart of the essential decision process involved in DIB stitching as presently envisioned. Block 20 of FIG. 7 depicts the first decision point, M1 denoting the DIB under consideration. Block 20 imposes two conditions, both of which must be met before stitching proceeds in this embodiment. The first such condition is that DIB M1 has 24 bit color. That is the image of which this DIB is a part is composed of colors selected from a group of around 1.6 million colors ($2^{24}$). This is not an inherent limitation on the present invention but a limitation based on convenience. The procedures of the present invention may be applied to images with 8 bit color or any color description the application may provide. However, it is the experience of the present inventors that image enhancements presently in use do not noticeably improve modest color palette images. While not an inherent limitation of the present invention, applying DIB stitching to less than 24 bit color tends to be a waste of effort and computer resources.

A second threshold criterion DIB M1 is to meet is that it be non-clipped. Clipping refers to the situation in which an application provides a DIB, M1, along with instructions that only a portion of M1 is to be printed on the page. That is, M1 is "clipped." Placing a DIB on a page may involve in one manifestation providing the device driver with the application-generated DIB containing (among other things) parameters defining the source rectangle and parameters defining the destination rectangle of the image. Non-clipped source rectangles typically provide an origin as (x,y) coordinates of (0,0) and position this rectangle on the page by providing origin coordinates of the destination rectangle as desired. However, to clip the source rectangle and display only a portion thereof (the nose of the giraffe in FIG. 1B, for example) one procedure for accomplishing this is to give a source rectangle origin as something other than (0,0). Such clipped DIBs are capable of being handled by the present DIB stitching procedures and are not inherently excluded from scope of the present invention. However, in practical applications of DIB stitching, the additional processing overhead incurred by handling clipped source rectangles many not be worth the effort.

Rendering an image to a page may involve two general types of clipping. Only a portion of the source rectangle may be selected for display, or "source clipping" described above. "Destination clipping" relates to less than the full destination rectangle being displayed on the page. For example, destination clipping results when a source rectangle is placed such that only a portion appears on the page. Unlike source clipping, destination clipping is handled within the DIB stitching processor of the present invention.

Figure 1A:
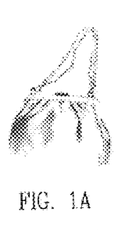
FIGS. 1A–1J: Typical page containing multiple distinct images.
Figure 1B:
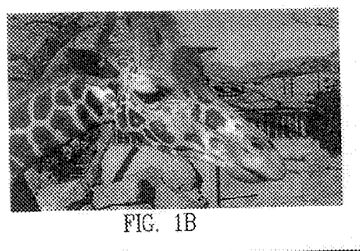
Figure 1C:
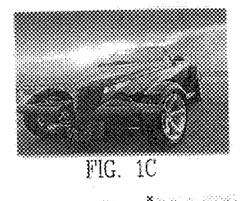
Figure 1D:
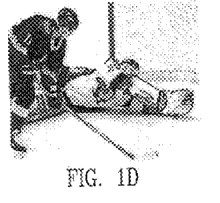
Figure 1E:
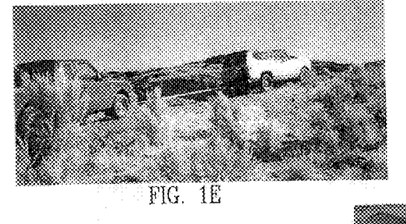
Figure 1F:
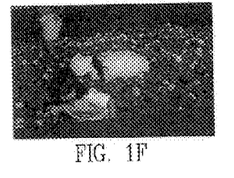
Figure 1G:
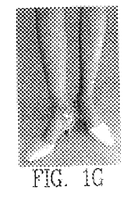
Figure 1H:
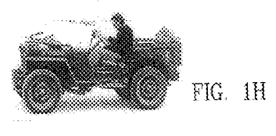
Figure 1I:
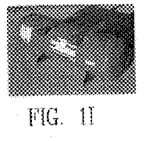
Figure 1J:
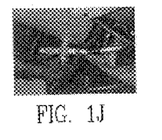

Having passed the threshold tests of block 20, another DIB is retrieved as M2 and compared with M1 in block 22. "Drawmode" refers to several drawing characteristics the GDI may specify for placing DIBs on the page as invoked by the application. If the drawmodes of M1 and M2 are different, this is evidence that such DIBs are not part of the same image and ought not to be stitched. One such DIB may come from the hot rod and one from the hockey player depicted in FIGS. 1C and 1D respectively. For such cases, global image enhancements across both FIGS. 1C and 1D is not the appropriate procedure. More desirable is to apply separate image enhancements to 1C and 1D to provide enhancements appropriate for each single image, not attempting to derive a single image enhancing procedure for distinct and unrelated images. Thus, different drawmode is indicative of separate images and DIB stitching for such DIBs is contraindicated.

The same reasoning applies if DIBs M1 and M2 have different scale factors. Like drawmode, the presence of differing scale factors is evidence that M1 and M2 are DIBs from separate and distinct images. Comparing scale factors should only be done with allowance for error. That is, scale factors will be considered the same if they are equal to within a tolerance specified by the user. The tolerance preferred by the present inventors is 10%. Stitching DIBs from separate images hinders, not assists, the image enhancing procedures in providing optimal image quality for each such image separately. Therefore, DIB stitching is not performed and termination is appropriate.

One such necessary property of a DIB is that it have the same orientation as previous DIBs. For example, an application may call to print an image on a page having an orientation that is not parallel with any edge of the page. That is, the image is tilted with respect to the page. Such images are typically presented to the device driver as rectangular DIBs initially sharing a common border of substantially the same length. As consecutive DIBs are received constructing an image tilted with respect to the page, common borders of DIBs will have different lengths. Such DIBs are not stitched. Also, as such images are built with a tilt orientation, gaps and small slices of image need to be added to complete the entire image. Such images are presently believed to require too much processing, slowing down the printing process unacceptably and, therefore, are not stitched according to the present invention.

Often images are compressed in order to conserve storage space. If the image received by the DIB stitching processor of the present invention is compressed, it is feasible within the scope of the present invention to decompress the image and then apply the DIB stitching algorithm described herein. However, the present inventors have found that decompression prior to DIB stitching is not typically worth the effort in terms of enhanced print quality. Thus, the inventors preferably terminate (or fail to begin) DIB stitching whenever a compressed image is received for reasons of practicality, not an inherent limitation of the present invention.

The above description of the present DIB stitching procedures are not limited to processing DIB sequentially as received or retrieved from the PDL file. For example, groups of contiguous DIBs may be presented as disjoint, lacking a common border. Rather than two separate images, such DIBs may grow as additional DIBs are stitched together to constitute a single unary image. An alternative embodiment of the present invention comprises full processing of all DIBs from the PDL file from "begin page" to "end page" commands. Then and only then decide which images are unary and suitable for common global image enhancement and which are not.

The DIB stitching processor of the present invention has several criteria for cessation of stitching. These criteria lead to one of two exit routes. 1) Termination suitable for subsequent application global image enhancements, and 2) Termination that is artifact-prone should global image enhancements be applied, in which case global image enhancement is by-passed, or causes a "bail out" case.

Figure 8A:
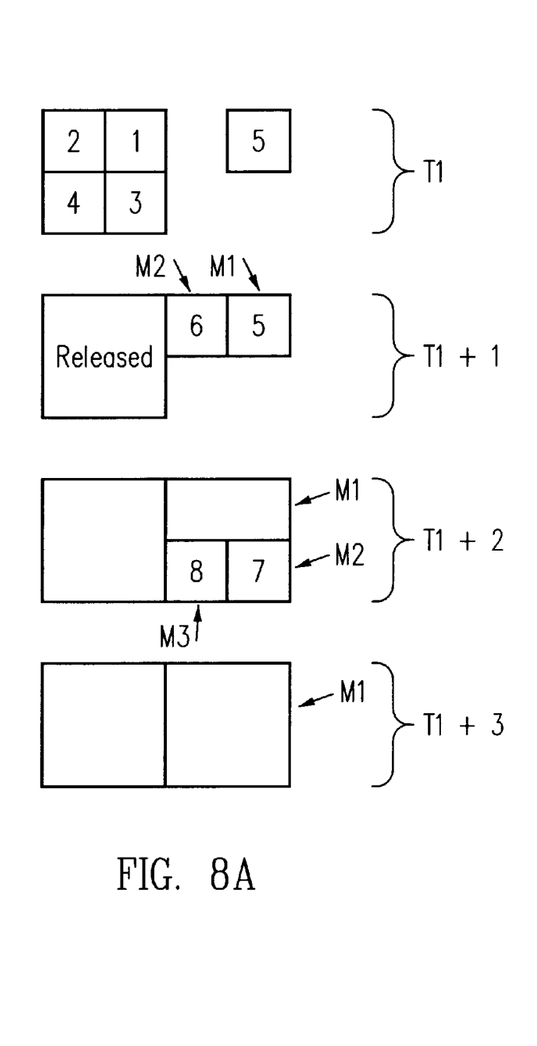
FIGS. 8A & 8B: Examples of "Bail-Out," in which "EOP" denotes End Of Page.

FIG. 8 gives examples of bail out. FIG. 8A depicts the case in which, even though tiles 1, . . . 4 were stitched, the new tile, 5, causes the unary 1, . . . 4 to be released as a single DIB because tile 5 does not share a common border with the unary 1, . . . 4. As additional DIBs are considered, eventually unary 5, . . . 8 touches unary 1, . . . 4 (T1+3), but unary 1, . . . 4 is already released. This causes a bailout case.

Figure 8B:
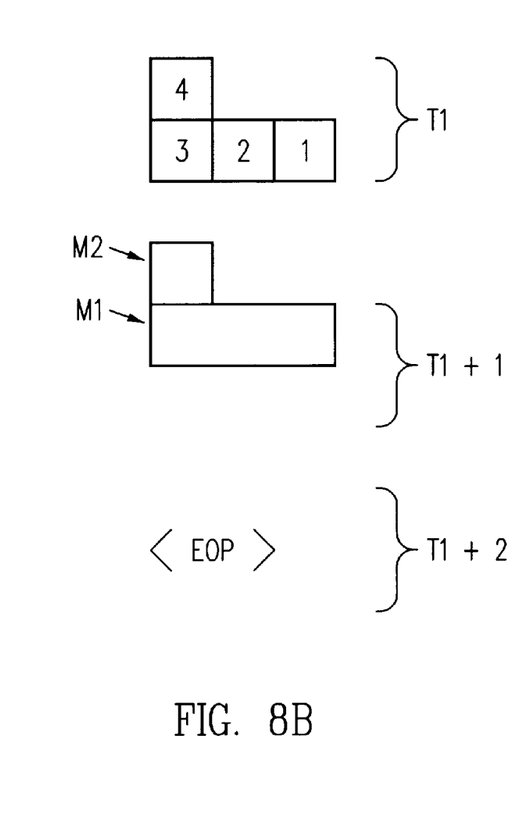

Another bail out case is depicted in FIG. 8B. In this example, only four tiles are received, followed by an "End of Page" ("EOP"). Since M2 in FIG. 8B ends up with a final range (length in the x direction) not the same as that of M1, it is not stitched to M1. Since M1 and M2 touch but are not stitched together, this causes a bail out case.

Having described the invention in detail, those skilled in the art will appreciate that, given the present disclosure, modifications may be made to the invention without departing from the spirit of the inventive concept described herein. Therefore, it is not intended that the scope of the invention be limited to the specific and preferred embodiments illustrated and described. Rather, it is intended that the scope of the invention be determined by the appended claims.

What is claimed is:

1. A method of creating an image from a sequence of memory objects including bitmaps comprising:
   A) retrieving said objects sequentially from a storage device; and,
   B) determining if a termination condition has occurred; and,
   C) if a termination condition has not occurred,
      i) stitching sequentially retrieved bitmaps into a single bitmap,
      ii) retrieving another object,
      iii) returning to step A; and,
   D) if a termination condition has occurred,
      i) determining if said termination condition permits artifact-free global processing; and,
         a) performing global processing and image rendering to the output device on all retrieved bitmaps if said termination condition permits artifact-free global processing; and,
         b) rendering all retrieved bitmaps to the output device while avoiding global image processing if said termination condition does not permit artifact-free global processing.

2. A method as in claim 1 wherein said artifact-free termination condition comprises retrieving an object other than a bitmap.

3. A method as in claim 2 wherein said artifact-free termination condition comprises retrieving an end-of-page object.

4. A method as in claim 1 wherein said artifact-free termination condition comprises exhausting said sequence of memory objects.

5. A method as in claim 1 wherein said artifact-free termination condition comprises retrieving two bitmaps in sequence wherein said bitmaps do not share a common border.

6. A method as in claim 1 wherein said termination condition not permitting artifact-free global processing comprises retrieving a bitmap that is not 24 color bit.

7. A method as in claim 1 wherein said termination condition not permitting artifact-free global processing comprises retrieving a compressed bitmap.

8. A method as in claim 1 wherein said termination condition not permitting artifact-free global processing comprises retrieving sequential bitmaps having different drawmodes.

9. A method as in claim 1 wherein said termination condition not permitting artifact-free global processing comprises retrieving sequential bitmaps having scale factors differing by more than a preset tolerance factor.

10. A method as in claim 9 wherein said tolerance factor is 10%.

11. A method as in claim 1 wherein said termination condition not permitting artifact-free global processing comprises retrieving a bitmap corresponding to a clipped source rectangle.

12. A method of creating an image from a sequence of memory objects including bitmaps comprising:
   A) retrieving said objects sequentially from a storage device; and,
   B) determining if a termination condition has occurred; and,
   C) if a termination condition has not occurred,
      i) stitching sequentially retrieved bitmaps into a single bitmap,
      ii) retrieving another object,
      iii) returning to step A; and,
   D) if a termination condition of sequential bitmaps not sharing a common border has occurred, stitching said bitmaps to any retrieved bitmap and return to step A; and,
   E) if a termination other than step D has occurred,
      i) determining if said termination condition permits artifact-free global processing; and,
         a) performing global processing and image rendering to the output device on all retrieved bitmaps if said termination condition permits artifact-free global processing; and,
         b) rendering all retrieved bitmaps to the output device while avoiding global image processing if said termination condition does not permit artifact-free global processing.

13. A method as in claim 12 wherein said artifact-free termination condition comprises retrieving an object other than a bitmap.

14. A method as in claim 13 wherein said artifact-free termination condition comprises retrieving an end-of-page object.

15. A method as in claim 12 wherein said artifact-free termination condition comprises exhausting said sequence of memory objects.

16. A method as in claim 12 wherein said termination condition not permnitting artifact-free global processing comprises retrieving a bitmap that is not 24 color bit.

17. A method as in claim 12 wherein said termination condition not permnitting artifact-free global processing comprises retrieving a compressed bitmap.

18. A method as in claim 12 wherein said termination condition not permitting artifact-free global processing comprises retrieving sequential bitmaps having different drawmodes.

19. A method as in claim 12 wherein said termination condition not permitting artifact-free global processing comprises retrieving sequential bitmaps having scale factors differing by more than a preset tolerance factor.

20. A method as in claim 19 wherein said tolerance factor is 10%.

21. A method as in claim 12 wherein said termination condition not permitting artifact-free global processing comprises retrieving a bitmap corresponding to a clipped source rectangle.

* * * * *